US 6,561,501 B2

(12) United States Patent
Bouhier et al.

(10) Patent No.: US 6,561,501 B2
(45) Date of Patent: May 13, 2003

(54) HYDRAULIC ANTIVIBRATION SLEEVE

(75) Inventors: Bernard Bouhier, Noyers sur Cher (FR); Frédéric Seibert-Sandt, Olivet (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/911,689

(22) Filed: Jul. 24, 2001

(65) Prior Publication Data

US 2002/0020950 A1 Feb. 21, 2002

(30) Foreign Application Priority Data

Jul. 31, 2000 (FR) .......................................... 00 10049

(51) Int. Cl.$^7$ ............................................... F16F 13/00
(52) U.S. Cl. .................................. 267/140.12; 267/219
(58) Field of Search ........................ 267/140.13, 140.12, 267/219, 220, 140.11, 140.5, 140.2, 141.2; 248/562, 632, 636, 638

(56) References Cited

U.S. PATENT DOCUMENTS

| 5,088,702 A | | 2/1992 | Thelamon et al. | |
|---|---|---|---|---|
| 5,123,634 A | * | 6/1992 | Schwerdt | 267/140.12 |
| 5,169,130 A | * | 12/1992 | Theiamon et al. | 267/140.12 |
| 5,188,346 A | | 2/1993 | Hamada et al. | |
| 5,199,691 A | * | 4/1993 | Bouhier et al. | 267/140.12 |
| 5,286,011 A | * | 2/1994 | Strand | 267/140.12 |
| 5,320,332 A | | 6/1994 | Hamaekers | |
| 5,711,513 A | * | 1/1998 | Bretaudeau et al. | 267/140.12 |
| 5,975,509 A | | 11/1999 | Miyamoto | |

FOREIGN PATENT DOCUMENTS

| EP | 0 411 997 A1 | 7/1990 | ............ F16F/13/00 |
|---|---|---|---|
| JP | 63214531 | 9/1988 | ............ F16F/13/00 |
| JP | 11148531 | 6/1999 | ............ F16F/13/06 |

OTHER PUBLICATIONS

Search Report issued by the French Patent Office for parent French Application No. 00 10049 filed on Jul. 31, 2000; report dated Mar. 12, 2001.

* cited by examiner

Primary Examiner—Matthew C. Graham
Assistant Examiner—Mariano Sy
(74) Attorney, Agent, or Firm—Marshall, Gerstein & Borun

(57) ABSTRACT

A hydraulic antivibration sleeve comprising two constrictive strength members interconnected by an elastomer body which defines first and second diametrically opposite working chambers and a side compensation chamber. The two working chambers communicate with each other via a constricted passage, while the compensation chamber communicates with the first working chamber only via another constricted passage. The elastomer wall which defines the second working chamber is free and is not in contact with the inner strength member except in a certain range of values for the radial static load supported by the sleeve: this provides two different modes of operation depending on the value of said static load.

9 Claims, 3 Drawing Sheets

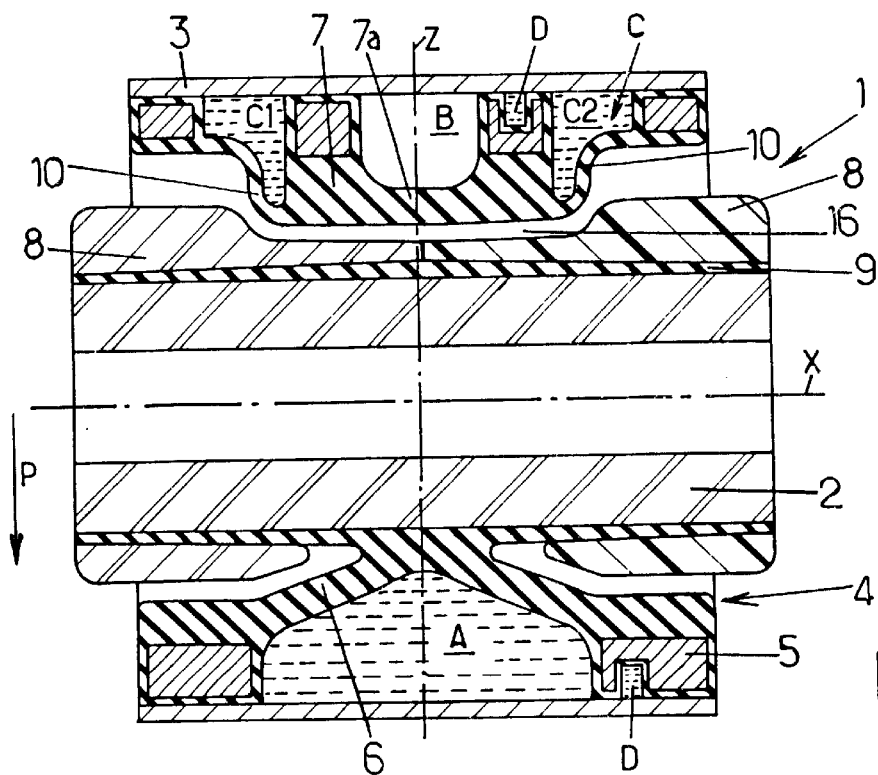

HYDRAULIC ANTIVIBRATION SLEEVE

FIELD OF THE INVENTION

The present invention relates to hydraulic antivibration sleeves.

More particularly, the invention relates to a hydraulic antivibration sleeve comprising:

- a rigid inner strength member extending longitudinally along a central axis between two axial ends;
- an annular rigid outer strength member which surrounds the inner strength member;
- an elastomer body interconnecting the inner and outer strength members, said elastomer body comprising:
  - a first thick elastomer wall adapted to support a permanent load of value lying in a certain operating domain and applied between the inner and outer strength members parallel to a main vibration direction perpendicular to said central axis, said first thick elastomer wall presenting a central portion secured to the inner strength member and a peripheral portion secured to the outer strength member, thereby defining part of a first liquid-filled working chamber; and
  - a second thick elastomer wall having a peripheral portion secured to the outer strength member and defining a second liquid-filled working chamber;
- a liquid-filled compensation chamber defined by at least a first flexible elastomer wall that is easily deformable and thinner than said first and second thick elastomer walls;
- a first constricted passage putting said first working chamber into communication with the compensation chamber; and
- a second constricted passage putting the second working chamber into communication with one of the other two chambers, the first and second constricted passages being dimensioned to present respective first and second different resonant frequencies.

BACKGROUND OF THE INVENTION

Document EP-A-0 411 997 describes an element of such a sleeve in which the second working chamber is defined in part by the first thick wall of the elastomer body, while the second thick wall of the elastomer body separates the two working chambers. In that known antivibration sleeve, the compensation chamber which communicates with both working chambers is placed diametrically opposite the working chamber, and the flexible elastomer walls which define said compensation chamber is integrally formed with the elastomer body. The flexible wall is independent of the inner strength member and presents a peripheral portion secured to the outer strength member.

That prior art antivibration sleeve gives entire satisfaction in that the two working chambers and the two constricted passages provide particularly effective damping of vibration in the vicinity of the two resonant frequencies of the constricted passages.

Nevertheless, the operation of such known antivibration sleeves is independent of the static load applied between the inner and outer strength members. Unfortunately, in some cases, it can be useful for the antivibration sleeve to operate differently depending on the static load applied between the two strength members.

OBJECTS AND SUMMARY OF THE INVENTION

A particular object of the invention is to resolve this technical problem.

To this end, according to the invention, an antivibration sleeve of the kind in question is characterized in that the second working chamber is diametrically opposite to the first working chamber about the central axis, the two working chambers being substantially in alignment along the main direction of vibration, the second thick elastomer wall presenting a free central portion which is disposed in the vicinity of the inner strength member and which is independent of said inner strength member; and in that the elastomer body is so dimensioned:
  that the free central portion of the second elastomer wall is in contact with the inner strength member when said static load lies in a first range of values belonging to said operating domain; and
  that the free central portion of the second elastomer wall is separate from the inner strength member by an empty space when the static load lies in a second range of values complementary to the first range of values in said operating domain.

By means of these dispositions, when the static load lies in the first range of values, relative vibratory motion between the two strength members of the sleeve gives rise to deformation in the two working chambers and thus to transfers of liquid between each of the working chambers and the corresponding chamber via the constricted passages: in this first mode of operation, particularly effective damping is obtained, in particular for frequencies of vibration close to the second resonant frequency.

In contrast, when the static load lies in the second range of values, only the first working chamber is influenced by the relative vibratory motion between the two strength members of the sleeve, such that the transfers of liquid take place mainly between said first working chamber and the compensation chamber via the first constricted passage: in this second mode of operation, vibrations are damped effectively at frequencies that are close to the first resonant frequency.

In preferred embodiments of the invention, use can optionally be made of one or more of the following dispositions:

the second constricted passage interconnects the first and second working chambers;
  the compensation chamber is adjacent at least to the second working chamber and is partially defined by the second thick elastomer wall;
  the compensation chamber is generally U-shaped and comprises:
    first and second side portions which are disposed on either side of the second working chamber and which are defined in part at least by the second thick elastomer wall, said first and second side portions being defined towards the axial ends of the inner strength member respectively by a first flexible elastomer wall and by a second flexible elastomer wall, each of the first and second flexible elastomer walls being connected at least to the outer strength member; and
    a central portion which extends substantially parallel to the central axis between said two side portions;
  the first and second flexible elastomer walls are molded integrally with the second thick elastomer wall;
  the empty space between the second thick elastomer wall and the inner strength member is filled with air and communicates with the atmosphere;
  the first and second flexible elastomer walls are annular pieces distinct from the elastomer body, each of which pieces is connected to the inner and outer strength members, the side portions of the compensation chamber being annular and adjacent to the two working chambers, and the central portion of said compensation chamber comprising the empty space between the second thick elastomer wall and the inner strength member;

the elastomer body has a solid central portion which extends angularly around the inner strength member from the first working chamber to the second working chamber, the second constricted passage being formed in said solid central portion; and the central portion of the compensation chamber is angularly connected to the first working chamber via an additional passage formed between the elastomer body and the outer strength member, said passage being normally closed by a flexible elastomer rib projecting radially outwards from the elastomer body to a free edge placed in contact with the outer strength member, said flexible rib being dimensioned to fold down and open said additional passage between the central portion of the compensation chamber and the first working chamber when the pressure difference between these chambers is greater than a predetermined value.

BRIEF DESCRIPTION OF THE DRAWINGS

Other characteristics and advantages of the invention appear from the following description of two embodiments, given as non-limiting examples and described with reference to the accompanying drawings.

In the drawings:

FIG. 5 is a view similar to FIG. 1 showing the antivibration sleeve in a second operating state; and FIG. 6 is a view similar to FIG. 1 in a second embodiment of the invention.

MORE DETAILED DESCRIPTION

Figure 1:
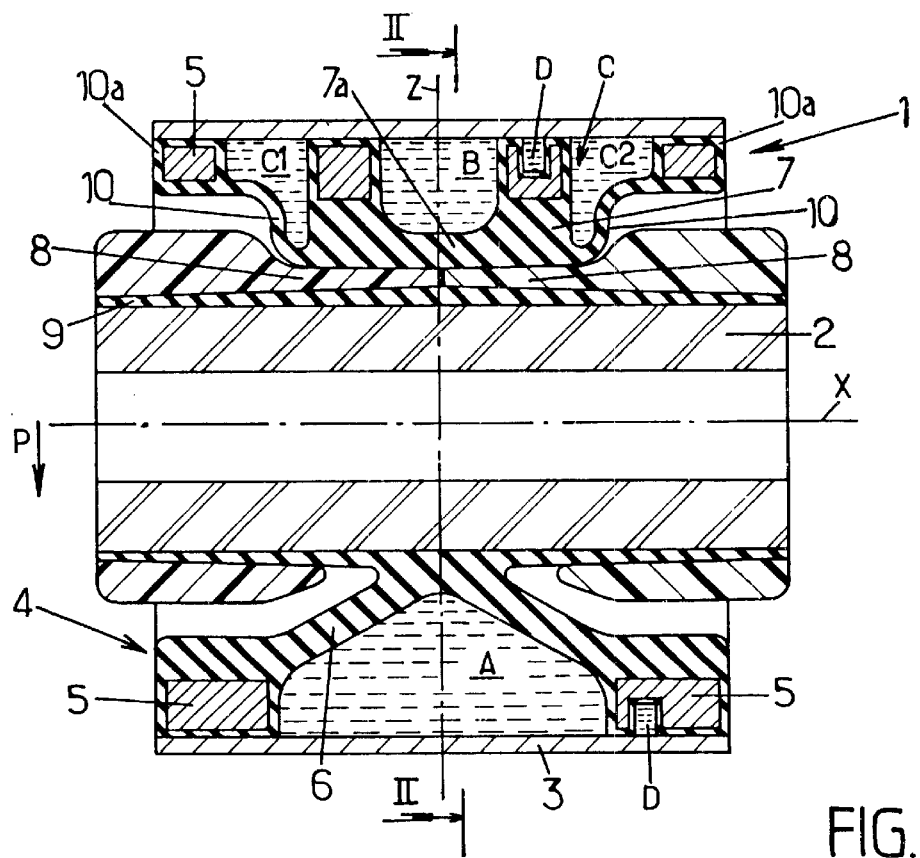
FIG. 1 is a vertical longitudinal section view through an antivibration sleeve constituting a first embodiment of the invention.
Figure 2:
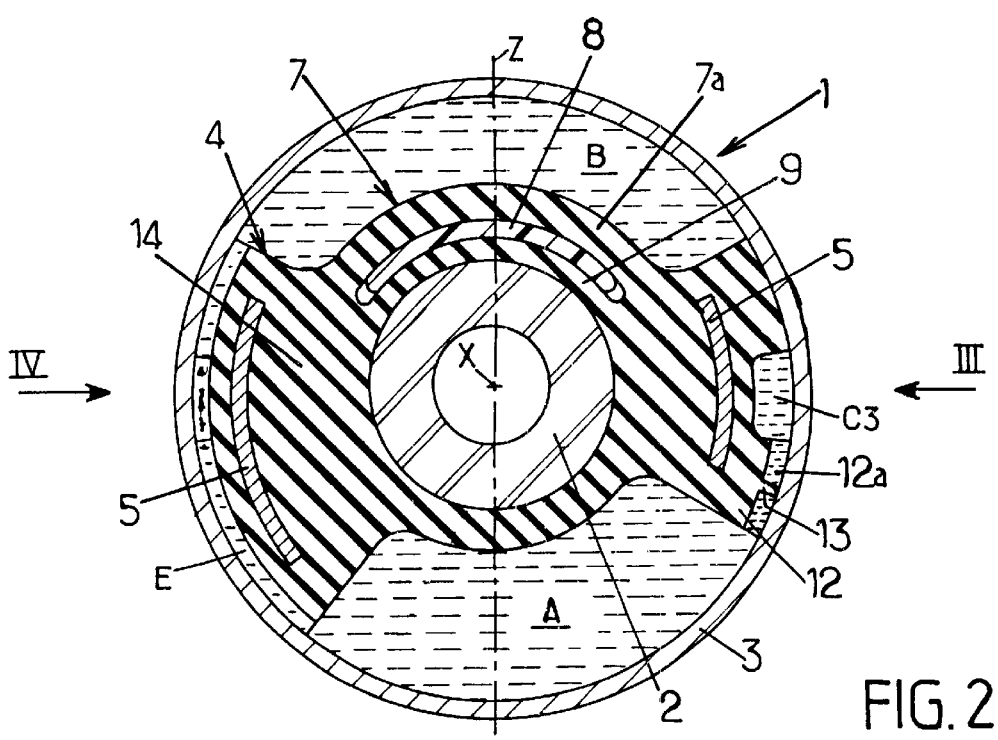
FIG. 2 is a cross-section view of the FIG. 1 sleeve, the section being taken on line II—II of FIG. 1.

FIGS. 1 and 2 show a hydraulic antivibration sleeve 1 comprising a rigid inner strength member 2 generally made of metal and extending longitudinally along a central axis X between two axial ends of the sleeve.

This inner strength member is surrounded by a cylindrical strength member 3 likewise made of metal and extending longitudinally along the axis X, surrounding said inner strength member.

The strength members 2 and 3 are interconnected by an elastomer body 4 which is overmolded and bonded onto the inner strength member 2 and which includes at its outer periphery a rigid perforated cage 5 generally made of metal and suitable for providing a tight fit between the elastomer body 4 and the outer strength member 3 (where clamping between the periphery of the elastomer body and the outer strength member can be obtained in particular by inserting the elastomer body into the outer strength member and swaging the strength member).

The elastomer body 4 interconnects the inner and outer strength members 2 and 3 which can be fixed, for example, respectively to the bodywork of a motor vehicle and to one of the axles of the vehicle. Naturally, this application is not limiting, and the antivibration sleeve can be used for interconnecting other parts of a motor vehicle, including where appropriate, for connecting the engine and gear box unit to the vehicle bodywork.

The antivibration sleeve 1 serves firstly to support a permanent vertical load P, e.g. a fraction of the weight of the vehicle, said static load being exerted, for example, on the inner strength member 2, and secondly to damp vibration, in particular in the vertical direction Z which constitutes the main direction of vibration.

To this end, the elastomer body 4 co-operates with the outer strength member to define three hydraulic chambers, namely two working chambers A and B and a compensation chamber C.

The working chamber A is defined by a first thick wall 6 of elastomer which is adapted to support said static load P and which is shaped to give the chamber A the shape of a bell that flares vertically downwards towards the outer strength member.

The working chamber B is diametrically opposite the working chamber A about the central axis X and presents, for example, an upwardly flared shape extending to the outer strength member 3.

This working chamber B is defined by a thick wall 7 belonging to the elastomer body, said wall 7 being independent of the inner strength member and presenting a central portion 7a that is free and that is located in the vicinity of the inner strength member 2.

In certain ranges of static load values, said central portion 7a of the elastomer wall is in contact with the inner strength member 2 via rigid inserts of plastics material 8 engaged around a layer of elastomer 9 which is itself overmolded on the inner strength member 2.

Figure 3:
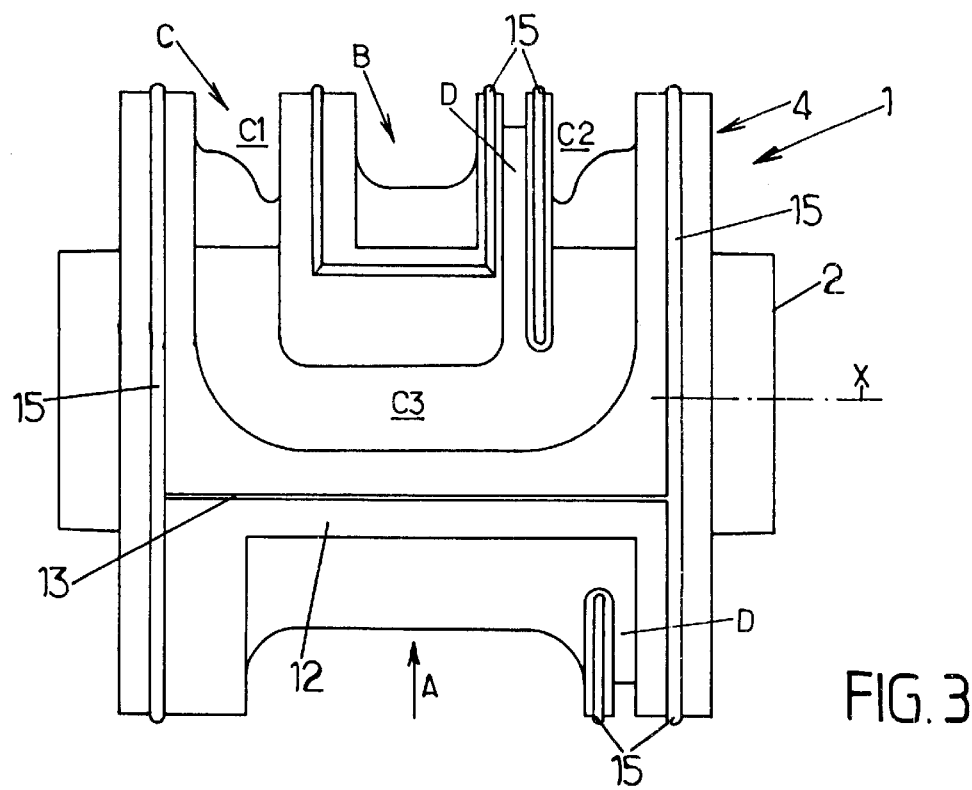
FIGS. 3 and 4 are views of the elastomer body and of the inner strength member of the sleeve of FIGS. 1 and 2, seen respectively along directions III and IV of FIG. 2.
Figure 4:
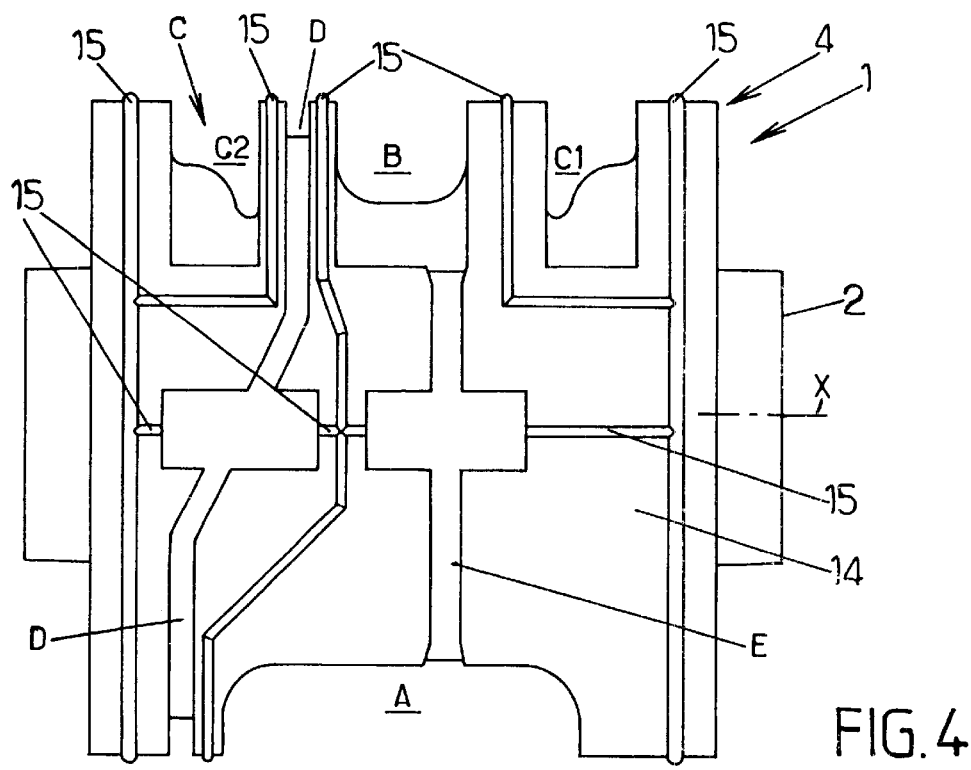

Furthermore, the compensation chamber C can clearly be seen in FIGS. 1, 3, and 4, is adjacent to the working chamber B, and is generally U-shaped having two side portions C1 and C2 which are located on either side of the chamber B in the X direction and which are interconnected by a central portion C3 which extends parallel to the X axis between the two side portions C1 and C2.

Each of the side portions C1 and C2 is defined between:
the outer strength member 3;
a side portion of the thick elastomer wall 7; and
a flexible elastomer wall 10 (see FIG. 1) that is considerably thinner and more flexible than the thick walls 6 and 7, each of the flexible walls 10 extending between firstly the central portion 7a of the thick elastomer wall 7 and secondly an outer portion 10a which is reinforced by the perforated cage 5 and which is in leakproof contact with the outer strength member 3.

Furthermore, the central portion C3 of the compensation chamber is separated from the working chamber A by a solid elastomer portion 12 (see FIG. 2) which does not extend so far as to come directly into contact with the outer strength member 3, but which includes a rib 13 extending radially to a free end that is normally in leakproof contact with the inner surface of the outer strength member 3. Nevertheless, this rib 13 is adapted to fold down and open a direct passage 12a between the working chamber A and the compensation chamber C whenever there exists a pressure difference between these two chambers in excess of a predetermined value. This limits excess pressure in the working chamber, and it is also possible to use the rib 13 as a decoupling valve adapted to filter low amplitude vibrations (e.g. less than 1 millimeter (mm)) at high frequency (e.g. greater than 20 hertz (Hz)).

Furthermore, the central portion C3 of the compensation chamber also communicates with the working chamber A via a constricted passage D which is in the form of a groove formed in the periphery of the elastomer body, the shape of said groove being preferably determined at least in part by the perforated cage 5.

Finally, as can be seen in FIGS. 2 and 4, the working chambers A and B are interconnected via a second constricted passage E which is formed in the outer periphery of a solid portion 14 of the elastomer body coming into contact with the outer strength member 3, said solid portion 14 also separating the working chamber from the compensation chamber C in the circumferential direction.

In FIGS. 3 and 4, it can be seen that projecting sealing lips 15 can advantageously be provided on the outer surface of the elastomer body 4 so as to improve sealing at the contact between said elastomer body and the outer strength member 3.

The above-described antivibration sleeve operates as follows.

When the static load P applied between the strength members 2 and 3 is small enough, the inner strength member 2 remains in contact with the thick wall 7 defining the working chamber B, as shown in FIGS. 1 and 2.

In this first operating state, relative vertical vibratory motion between the two strength members 2, 3 gives rise to volume variations in both working chambers A, B and thus to transfers of liquid between these two chambers via the constricted passage E which presents a certain resonant frequency.

In this first operating state, the antivibration sleeve thus serves to damp vibration in a manner that is particularly effective in the vicinity of said resonant frequency.

In contrast, when the static load P applied to the inner strength member 2 is greater, as shown in FIG. 5, the inner strength member 2 is no longer in contact with the central portion 7a of the thick wall 7 and the central portion 7a of said thick wall is separated from the inserts 8 to leave an empty space 16 that is in communication with the atmosphere, such that the working chamber B is no longer influenced by the relative vibratory motion between the two strength members 2, 3.

In this mode of operation, vibratory motion thus gives rise to variations in the volume of the working chamber A but not to variations in the volume of the working chamber B.

These variations in the volume of the working chamber A give rise to transfers of liquid between said working chamber and the compensation chamber C via the constricted passage D, which passage has dimensions that are different from those of the constricted passage E, and therefore has a resonant frequency that is different from the resonant frequency of the passage E.

In this second operating state, the antivibration sleeve 1 is thus particularly effective at damping vibration at a frequency close to the resonant frequency of the passage D.

The second embodiment of the invention shown in FIG. 6 presents a structure and operation that are similar to the first embodiment as described above, such that this second embodiment is not described in detail below.

This second embodiment of the invention differs from the first embodiment in the following points:

the flexible elastomer walls 17 are no longer integrally formed with the elastomer body 4 but are constituted by two elastomer annuluses fitted thereto so as to form bellows, each extending radially between an inner ring 18 bonded to the central layer 9 of the elastomer body and an outer ring 19 with rigid metal reinforcement 20 engaged as a force-fit in the outer strength member 3;

the side portions C1, C2 of the compensation chamber are annular and extend all around the inner strength member 2, thus lying adjacent to both working chambers A, B; and the central portion C3 of the compensation chamber comprises the space that lies radially between the central portion 7a of the elastomer wall 7 and the central layer 9 of the elastomer body when said central portion 7a is no longer in contact with the inner strength member 2 of the sleeve.

We claim:

1. A hydraulic antivibration sleeve comprising:
   a rigid inner strength member extending longitudinally along a central axis between two axial ends;
   an annular rigid outer strength member which surrounds the inner strength member;
   an elastomer body interconnecting the inner and outer strength members, said elastomer body comprising:
      a first thick elastomer wall adapted to support a permanent load of value lying in a certain operating domain and applied between the inner and outer strength members parallel to a main vibration direction perpendicular to said central axis, said first thick elastomer wall presenting a central portion secured to the inner strength member and a peripheral portion secured to the outer strength member, thereby defining part of a first liquid-filled working chamber; and
      a second thick elastomer wall having a peripheral portion secured to the outer strength member and defining a second liquid-filled working chamber;
      a liquid-filled compensation chamber defined by at least a first flexible elastomer wall that is easily deformable and thinner than said first and second thick elastomer walls;
      a first constricted passage putting said first working chamber into communication with the compensation chamber; and
      a second constricted passage putting the second working chamber into communication with one of the other two chambers, the first and second constricted passages being dimensioned to present respective first and second different resonant frequencies;
   wherein the second working chamber is diametrically opposite to the first working chamber about the central axis, the two working chambers being substantially in alignment along the main direction of vibration, the second thick elastomer wall presenting a free central portion which is disposed in the vicinity of the inner strength member and which is independent of said inner strength member; and
   wherein the elastomer body is so dimensioned:
      that the free central portion of the second elastomer wall is in contact with the inner strength member when said permanent load lies in a first range of values belonging to said operating domain; and
      that the free central portion of the second elastomer wall is separate from the inner strength member by an empty space when the permanent load lies in a second range of values complementary to the first range of values in said operating domain.

2. An antivibration sleeve according to claim 1, in which the second constricted passage interconnects the first and second working chambers.

3. An antivibration sleeve according to claim 2, in which the compensation chamber is adjacent at least to the second working chamber and is partially defined by the second thick elastomer wall.

4. An antivibration sleeve according to claim 3, in which the compensation chamber is generally U-shaped and comprises:

first and second side portions which are disposed on either side of the second working chamber and which are defined in part at least by the second thick elastomer wall, said first and second side portions being defined towards the axial ends of the inner strength member respectively by a first flexible elastomer wall and by a second flexible elastomer wall, each of the first and second flexible elastomer walls being connected at least to the outer strength member; and a central portion which extends substantially parallel to the central axis between said two side portions.

5. An antivibration sleeve according to claim 4, in which the first and second flexible elastomer walls are molded integrally with the second thick elastomer wall.

6. An antivibration sleeve according to claim 4, in which the empty space between the second thick elastomer wall and the inner strength member is filled with air and communicates with the atmosphere.

7. An antivibration sleeve according to claim 4, in which the first and second flexible elastomer walls are annular pieces distinct from the elastomer body, each of which pieces is connected to the inner and outer strength members, the side portions of the compensation chamber being annular and adjacent to the two working chambers, and the central portion of said compensation chamber comprising the empty space between the second thick elastomer wall and the inner strength member.

8. An antivibration sleeve according to claim 4, in which the elastomer body has a solid central portion which extends angularly around the inner strength member from the first working chamber to the second working chamber, the second constricted passage being formed in said solid central portion.

9. An antivibration sleeve according to claim 4, in which the central portion of the compensation chamber is angularly connected to the first working chamber via an additional passage formed between the elastomer body and the outer strength member, said additional passage being normally closed by a flexible elastomer rib projecting radially outwards from the elastomer body to a free edge placed in contact with the outer strength member, said flexible rib being dimensioned to fold down and open said additional passage between the central portion of the compensation chamber and the first working chamber when the pressure difference between these chambers is greater than a predetermined value.

* * * * *